United States Patent [19]
Kainen

[11] Patent Number: 5,600,402
[45] Date of Patent: Feb. 4, 1997

[54] METHOD AND APPARATUS FOR PRODUCING THREE-DIMENSIONAL GRAPHIC IMAGES USING A LENTICULAR SHEET

[76] Inventor: Daniel B. Kainen, 137 Varick St., New York, N.Y. 10013

[21] Appl. No.: 433,976

[22] Filed: May 4, 1995

[51] Int. Cl.$^6$ ............................ G03B 27/32; G03B 35/14
[52] U.S. Cl. .............................................. 355/22; 396/330
[58] Field of Search ...................... 355/22, 19, 27, 355/33, 55, 77; 358/450; 354/101, 102; 352/58; 348/42, 51

[56] References Cited

U.S. PATENT DOCUMENTS

| | | | |
|---|---|---|---|
| Re. 35,029 | 8/1995 | Sandor et al. | 355/22 |
| 4,346,962 | 8/1982 | Holmes, Jr. | 350/128 |
| 4,600,297 | 7/1986 | Winnek | 355/22 |
| 5,004,335 | 4/1991 | Montes | 352/58 |
| 5,111,236 | 5/1992 | Lo | 355/22 |
| 5,192,969 | 3/1993 | Igarashi et al. | 355/22 |
| 5,302,989 | 4/1994 | Taguchi et al. | 354/112 |
| 5,349,419 | 9/1994 | Taguchia et al. | 355/22 |
| 5,412,449 | 5/1995 | Lam | 355/22 |
| 5,432,580 | 7/1995 | Tokuda | 354/298 |
| 5,455,689 | 10/1995 | Taylor et al. | 358/450 |
| 5,500,712 | 3/1996 | Miyawaki et al. | 355/22 |

*Primary Examiner*—Arthur T. Grimley
*Assistant Examiner*—Herbert Victor Kerner
*Attorney, Agent, or Firm*—Jay H. Maioli

[57] ABSTRACT

A system for producing low-cost, 3-D stereoscopic encoded images in which encoded images are produced by capturing multiple parallax angle views of a scene, separating each view into narrow rectangular segments, interleaving these segments and displaying the resulting image on a flat surface. The image is placed at the focal plane of a lenticular sheet, and the interleaved segments of the image are aligned with the lenticules of the lenticular sheet. When the encoded image is viewed through the lenticular sheet a 3-D image is formed. The 3-D stereoscopic encoded image may be formed on a computer-driven printer, on a photographic emulsion or on a video display terminal. The image may be a single still rendering or it may represent a frame of a motion picture.

15 Claims, 10 Drawing Sheets

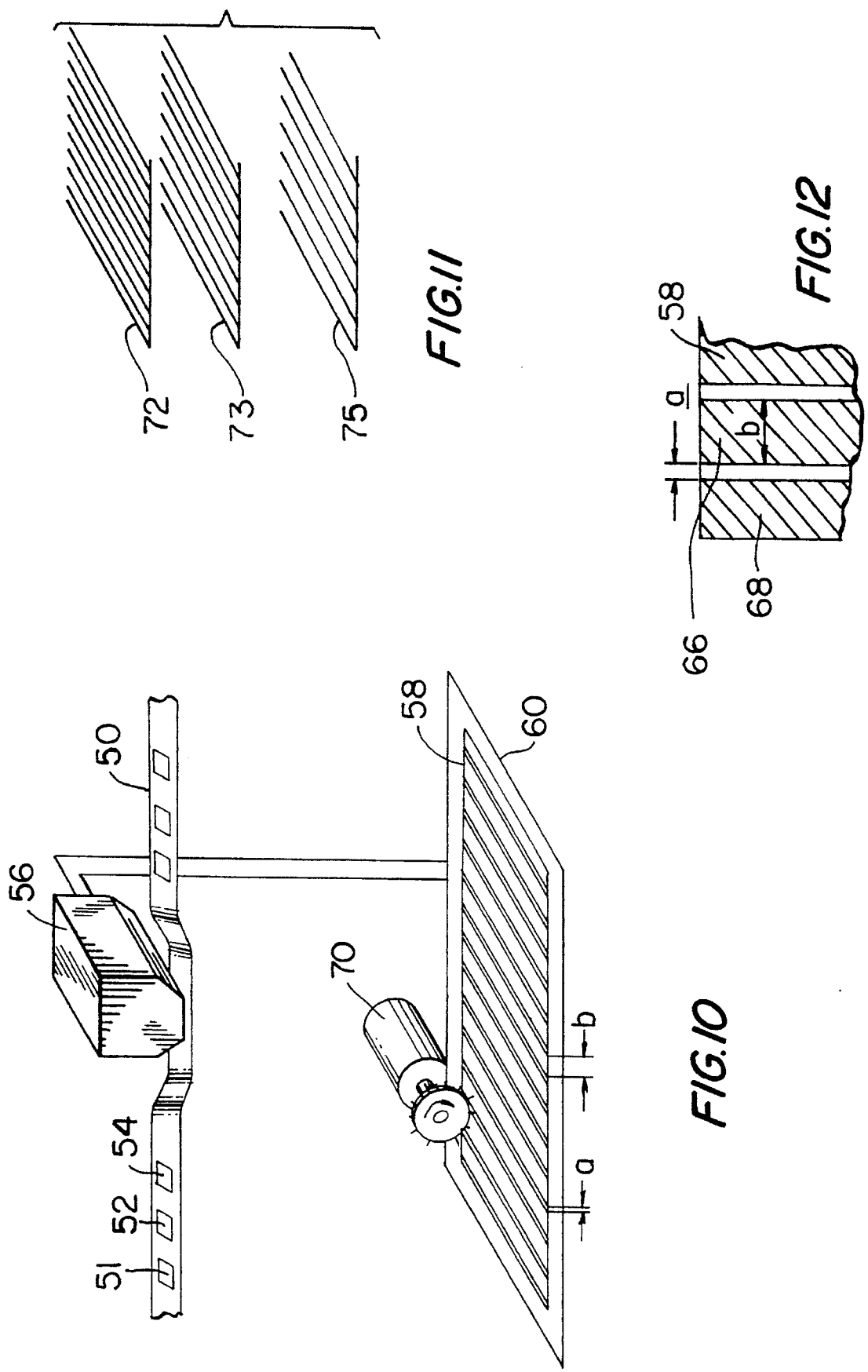

METHOD AND APPARATUS FOR PRODUCING THREE-DIMENSIONAL GRAPHIC IMAGES USING A LENTICULAR SHEET

BACKGROUND OF THE INVENTION

1. Field of the Invention

This invention relates generally to the field of 3-D stereo imaging and, more particularly, to producing low-cost, 3-D stereo encoded images on computer-driven printers, on photographic emulsions, and on video display terminals using a computer or other encoding device. The 3-D stereo encoded images thus produced are viewed through a separate lenticular sheet to produce a 3-D image.

2. Description of Related Art

The production of 3-D stereo representations by forming an image on a sheet bonded to a lenticular laminate is now known. U.S. Pat. No. 4,814,826 discloses a method for exposing lenticular photographic print material from multiple film negatives each representing a different parallax view of a subject to produce a 3-D stereo image.

Methods for producing hard-copy 3-D images from a computer printer are also known. U.S. Pat. No. 5,121,343 discloses a computer-driven printer for producing self-aligned stereo images using a special paper, which is bonded to a sheet of polarizing material. The resultant sheet is viewed through polarized glasses to reveal a 3-D image.

Known methods of producing 3-D images have several drawbacks. For example, because the underlying image and the viewing sheet must be precisely aligned, the production of these images has required that the printed image be bonded with the viewing sheet. This means that the resulting laminate is expensive to produce, and the laminate is much thicker than the underlying picture, making it cumbersome to package where multiple images in a single publication are desired, for example, in a calendar or a book. Further, special equipment and expertise are required to produce these images, making their production inconvenient for the casual user.

Where a polarizer sheet is used, special spectacles must be worn to separate right- and left-eye images. This adds expense, makes viewing more cumbersome, and limits the number of viewers that can observe the three dimensional image at one time. Such a system would be impractical for an advertising display.

OBJECTS AND SUMMARY OF THE INVENTION

A principal object of the present invention is to provide a simplified method of producing 3-D stereo images using standard, low-cost printing technology.

It is a further object of the present invention to provide a method for producing 3-D stereo images that do not require the viewer to wear special spectacles.

It is a still further object of the present invention to provide a system for producing 3-D stereo images using a computer.

It is an additional object of the present invention to provide a method for producing 3-D stereo images that may be viewed in a sequential fashion, as in a motion picture.

According to one embodiment of the present invention, 3-D stereo images are produced by scanning several views of a scene into a computer memory, merging the images to produce a sequence of interleaved, narrow, rectangular segments of each view, and printing the resulting file on a computer printer such that the spacing between the interleaved rectangles corresponds to the spacing of the lenticules of a lenticular sheet. The printed image and the lenticular sheet are then aligned in a frame to produce a 3-D image.

According to another embodiment of the present invention, 3-D stereo images are produced by exposing photographic film to multiple views of the same scene at different parallax angles through a lenticular sheet. The resulting image is then printed at a standard enlargement size such that the spatial frequency of the resulting lenticularly exposed areas corresponds to the spatial frequency of a second lenticular sheet.

In still another embodiment of the present invention, interleaved, narrow, rectangular segments of multiple parallax angle views of a subject are printed on a photographic enlarger using a mask. The mask is moved across the print and exposures are made of each view such that the pitch of the interleaved images corresponds to the spatial frequency of a lenticular sheet.

According to yet another embodiment of the present invention, the interleaved rectangular segments produced by one of the three embodiments described above are made on a transparent sheet, such as a photographic slide, and projected onto a frosted screen that is covered with a lenticular sheet whose spatial frequency is equal to the spatial frequency of the interleaved segments of the projected image. When the projected image is viewed through the lenticular sheet, a 3-D image is formed. The projected images may be still pictures or frames of a motion picture.

In another embodiment of the present invention, the image file produced in the first embodiment described above is displayed on a video display terminal. The video display terminal is covered with a lenticular sheet. The spatial frequency of the interleaved image segments is equal to the spatial frequency of the lenticular sheet. When the image on the video display terminal is viewed through the lenticular sheet, a 3-D image is formed.

The above and other objects, features, and advantages of the present invention will become apparent from the following detailed description of illustrative embodiments thereof to be read in conjunction with the accompanying drawings, in which like numerals represent the same or similar elements.

BRIEF DESCRIPTION OF THE DRAWINGS

FIG. 10 is a representation of a third embodiment according to the present invention;

FIG. 11 is a detailed view of a mask used in the embodiment of FIG. 10;

FIG. 12 shows an alternative set of masks used in the embodiment of FIG. 10;

DETAILED DESCRIPTION OF THE PREFERRED EMBODIMENTS

Figure 1:
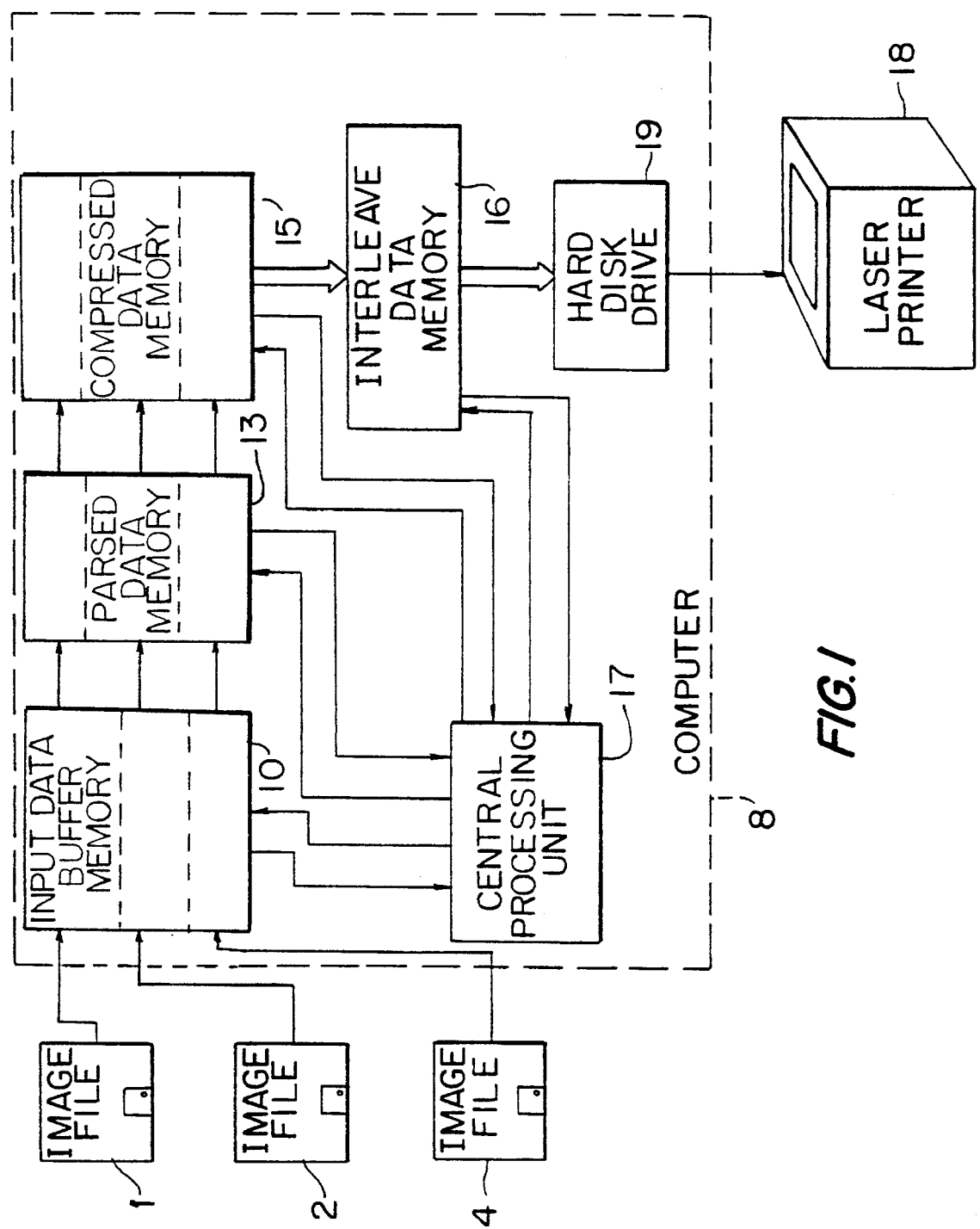
FIG. 1 is a representation of a first embodiment according to the present invention.

FIG. 1 shows a computer 8 and printer 18 used in the first embodiment of the present invention, in which input image files 1, 2, and 4, which represent views of a subject from different parallax angles, are captured by some known method, such as by a scanner or a CCD camera. These image files are loaded into an input data buffer segment 10 of the computer memory by a central processing unit (CPU) 17. The data for each of the input image files 1, 2, 4 is parsed into narrow rectangular fields by the CPU 17 and stored in a parsed data memory segment 13 of the overall computer memory. The width of each of the rectangular fields is compressed by a ratio equal to the reciprocal of the number of parallax views of the subject captured by the CPU 17 and is stored in a compressed data memory segment 15 of the computer memory. The compressed fields are then interleaved by the CPU 17 and stored in an interleave data memory segment 16 of the computer memory.

Figure 2:
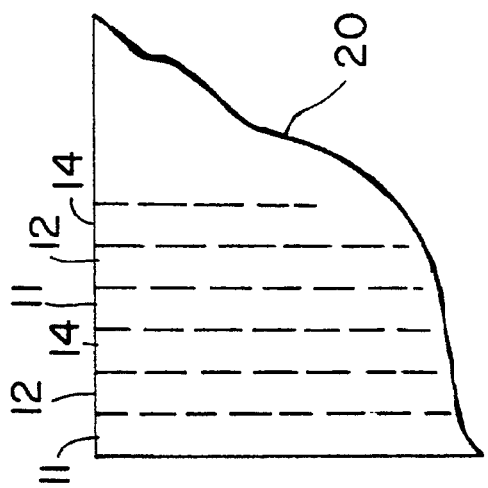
FIG. 2 is a detail of an output produced by the embodiment of FIG. 1.

The resulting output image file 20, as shown in FIG. 2, is stored on a hard disk drive 19 of the computer 8 shown in FIG. 1. The output image file 20 contains regions 11, 12, and 14 which each correspond to a portion of the data from the input image files 1, 2, and 4, respectively. The output image file 20 is then printed using a standard laser printer 18 as shown in FIG. 1. The resulting output 20 is graphically equivalent to the output image file as shown in FIG. 2. Alternatively, the output image file could be printed on a computer-driven slide printer or a motion picture printer.

Figure 3:
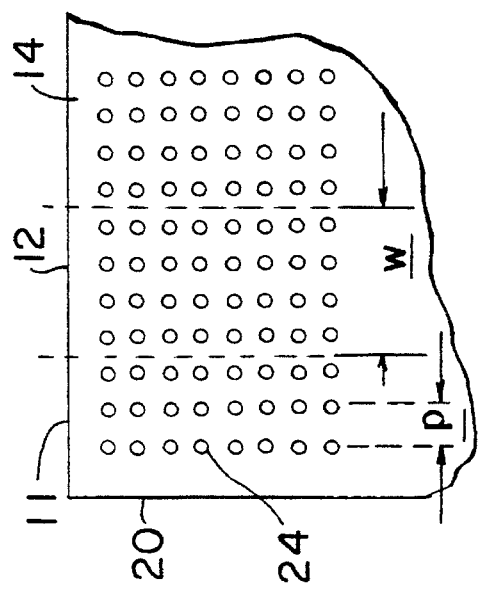
FIG. 3 is a microscopic detail of the output in the embodiment of FIG. 2.

FIG. 3 shows a microscopic view of the output 20, in which a distance p corresponds to the distance between pixels 24 of the computer printer 18. For many common laser printers this distance will be 1/300 inches. Distance w corresponds to the width of the regions 11, 12, and 14. The width w of these regions is an integer multiple greater than one of the distance p between laser printer pixels, such that each of the image regions 11, 12, 14 is formed by two or more lines of printer pixels 24.

Figure 4:
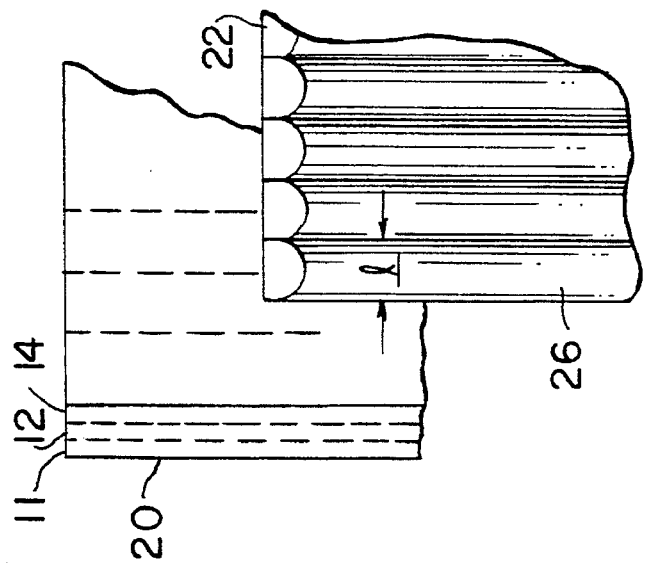
FIG. 4 is a representation of the lenticular sheet and output of the embodiment of FIG. 1.

FIG. 4 is a view showing the output 20 in conjunction with a lenticular sheet 22. Again, the distance w corresponds to the width of the regions 11, 12, and 14. The distance l corresponds to the width of each lenticule 26 on the lenticular sheet 22. If, for example, the output image file contains three views of the subject 1, 2, 4, then the width l of the lenticule 26 will correspond to three times the width w of each image region 11, 12, 14, so that the width of each lenticule 26 will cover one narrow, rectangular field 11, 12, 14 of each of the input image files 1, 2, 4. Because the compression ratio of the segments of the input image files 11, 12, 14 equals the reciprocal of the number of input image files, the resulting output will have the same aspect ratio as each of the original input image files 1, 2, 4.

Figure 5:
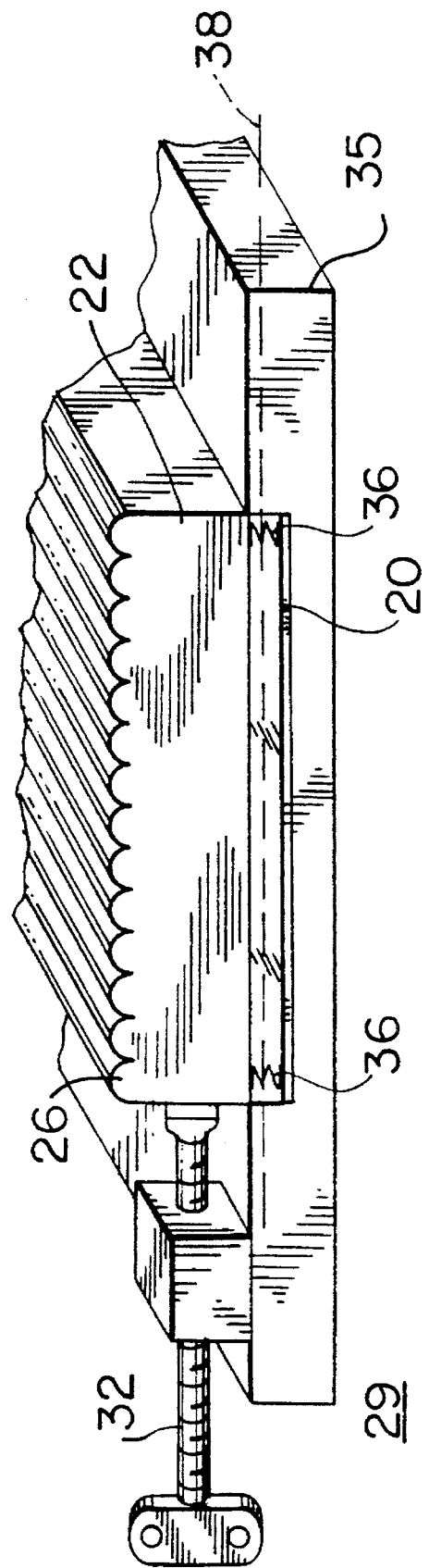
FIG. 5 is a view of an alignment frame of the embodiment of FIG. 1.

FIG. 5 shows an alignment apparatus 29 for positioning the lenticular sheet 22 relative to the output 20. The output 20 rests in a recess in the frame 35 and is held in place by retaining springs 36. The lenticular sheet 22 is in contact with the output 20, so that the output 20 is at the focal plane 38 of the lenticules 26 of the lenticular sheet 22. A micrometer screw 32 moves the lenticular sheet 22, until the lenticules 26 are aligned with the image regions 11, 12, 14.

Figure 6:
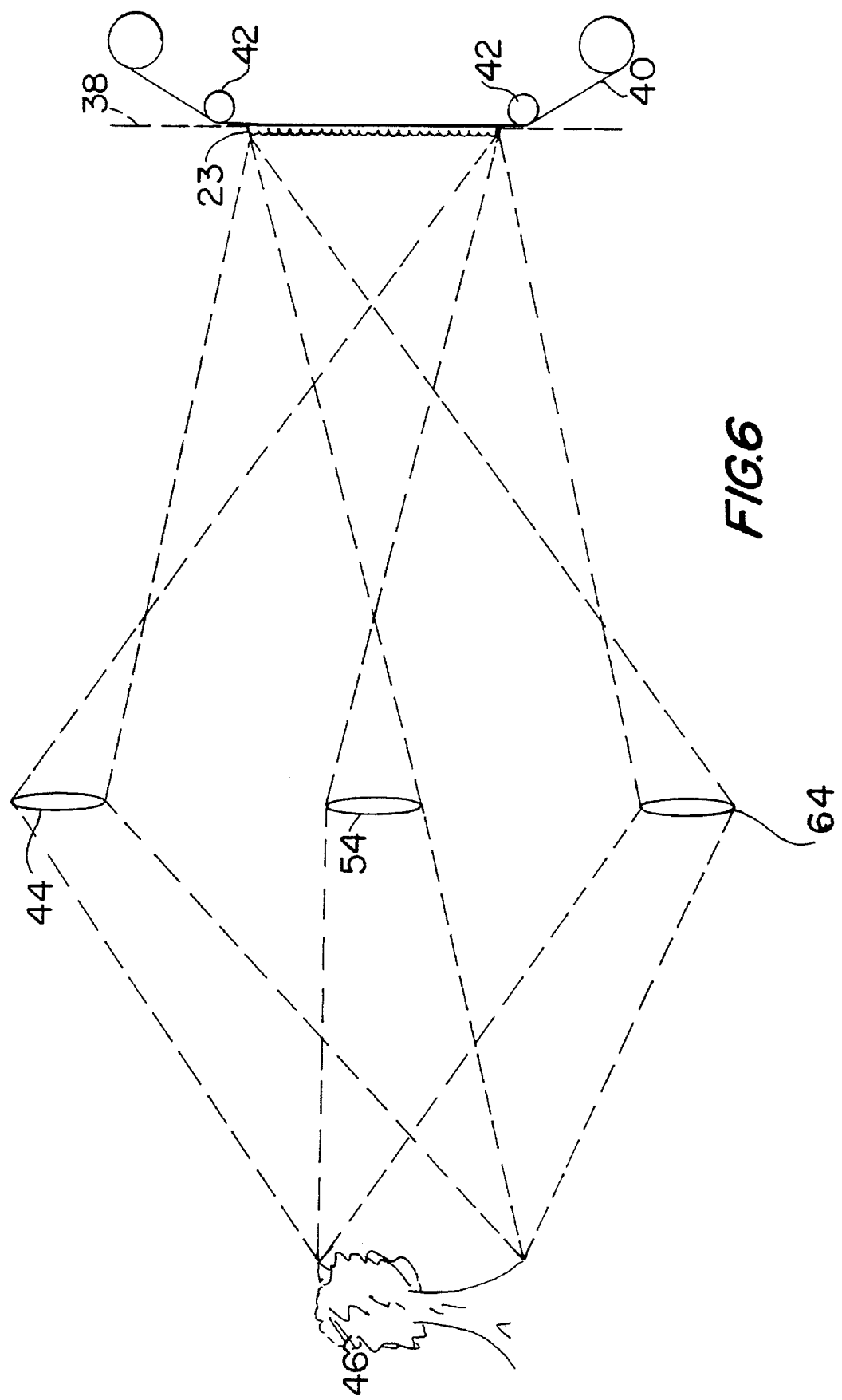
FIG. 6 is a representation of a second embodiment according to the present invention.

FIG. 6 shows a second embodiment of the present invention, in which a subject 46 is viewed by anamorphic lenses 44, 54 and 64. The anamorphic lenses 44, 54, 64, are coplanar and are separated from each other to provide multiple, parallax angle views of the subject 46. The images formed by the anamorphic lenses 44, 54, 64 are focused on a lenticular sheet 23. Photographic film 40 is pressed against the back side of the lenticular sheet 23 by rollers 42 so that the film 40 is at the focal plane 38 of the lenticular sheet 23. The film 40 is exposed with the multiple, parallax views of the subject 46 and processed by conventional means.

Figure 7:
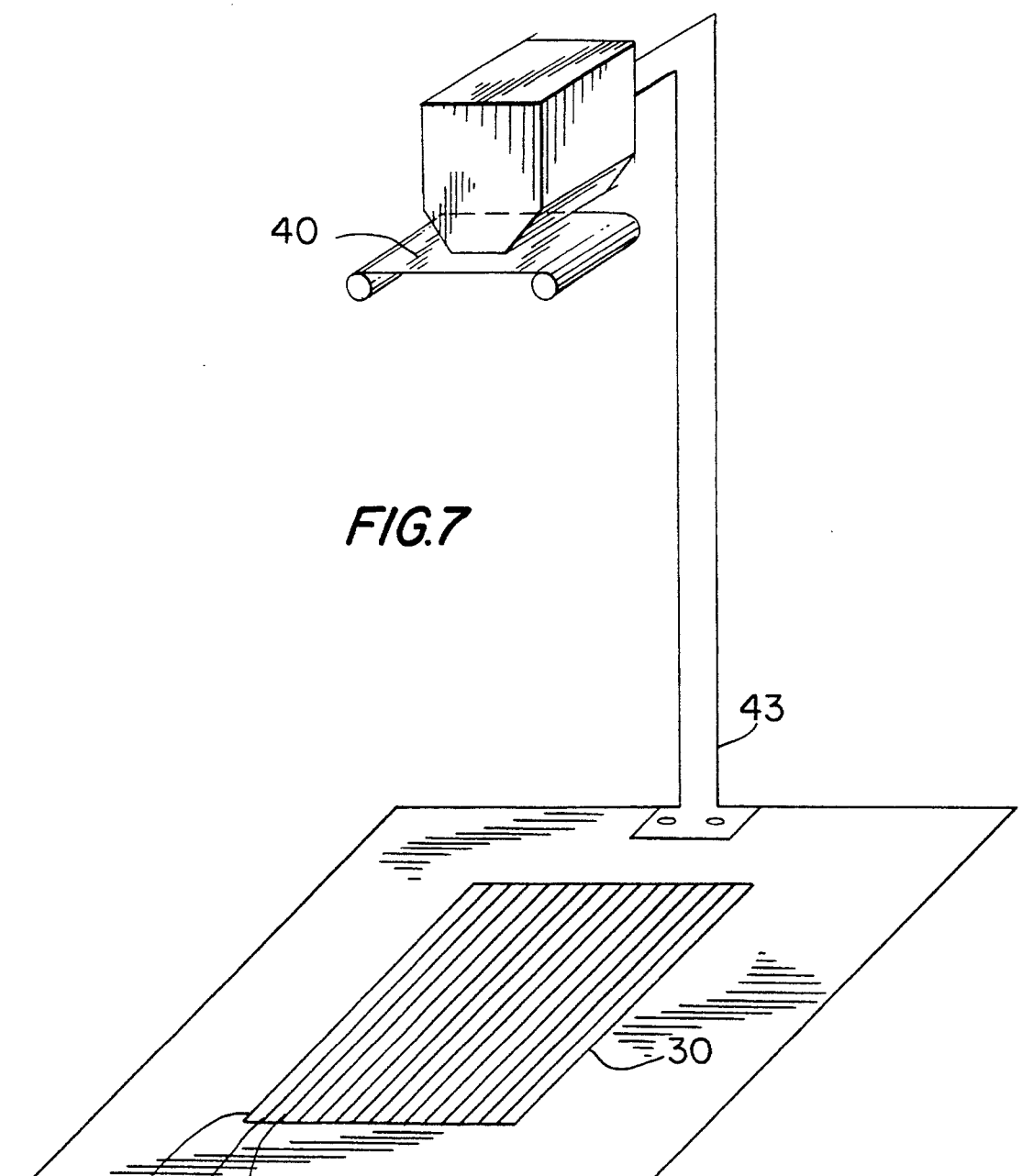
FIG. 7 is a view of a photographic enlarger used in the embodiment of FIG. 6.
Figure 8:
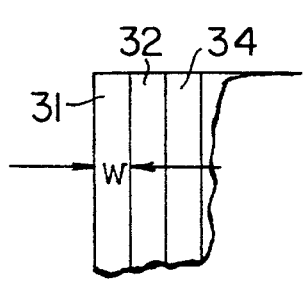
FIG. 8 is a detailed view of the printed image produced in the embodiment of FIG. 6.

FIG. 7 shows the processed film 40 loaded into a photographic enlarger 43 to produce a print 30, and FIG. 8 shows a detailed view of the print 30. Regions 31, 32, and 34 correspond to areas on the film 40 which were exposed with views of the subject by anamorphic lenses 44, 54, and 64 respectively.

Figure 9:
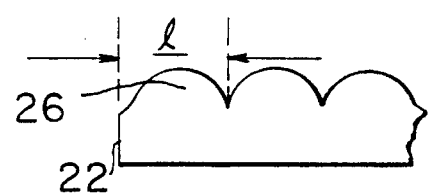
FIG. 9 is a detailed view of the lenticular sheet used to view the printed image produced by the embodiment of FIG. 6.

FIG. 9 shows a detailed view of a lenticular sheet 22. The width of the lenticules 26 of the lenticular sheet is shown at l. The enlargement ratio of the enlarger 43 is selected so that the width w of the regions 31, 32, and 34 are each a reciprocal of the number of views taken times the width l of a lenticule 26 of a lenticular sheet 22. As in the first embodiment, each lenticule 26 of the lenticular sheet 22 covers one set of segments 31, 32, 34 of the complete image of the subject. Alternatively, the print 30 could be produced by contact printing from the film 40, that is, with an enlargement ratio of 1:1. In that case, the lenticular sheet 22 used to view the print would be identical to the lenticular sheet 23 used to expose the film in FIG. 6.

The print 30 is then developed using a conventional process and the resulting finished print 30 is aligned with the lenticular sheet 22 using the apparatus shown in FIG. 5.

FIG. 10 shows a third embodiment of the present invention, in which multiple parallax views of the same subject 51, 52, 54 are taken sequentially on the same strip of photographic film 50. The film is loaded into a photographic enlarger 56, and a line-screen mask 58 is placed above the photographic paper 60.

FIG. 11 shows a detailed view of the line-screen mask 58, in which narrow, rectangular, transparent regions 66 of width are separated by opaque regions 68 of width b. The width a of the transparent regions 66 of the line-screen mask 58 is the reciprocal of the number of views of the subject 51, 52, 54 times the width l of the lenticules 26 of the lenticular sheet 22 shown in FIG. 9. The width b of the opaque regions 68 is equal to the width l of the lenticules 26 of the lenticular sheet 22 minus the width a of the transparent regions 66 of the line screen mask 58, so that the spatial frequency of the line-screen mask 52 equals the spatial frequency of the lenticular sheet 22. The line screen mask 58 is placed over the photographic paper 60 and the first of the parallax views of the subject 51 is exposed. The line screen mask 58 is then moved a distance a laterally by a stepper motor 70. The next parallax view of the subject 52 is exposed, and the process is repeated until all the parallax views of the subject 51, 52, 54 are exposed and the mask has been moved a distance l.

Alternatively, instead of moving the mask 58 to expose each of the parallax views of the subject, a series of masks 72, 73, 75, as shown in FIG. 12, each corresponding to a different respective parallax angle view of the subject 51, 52, 54 are used. The photographic paper 60 is exposed though each mask with its corresponding parallax view image. The photographic paper 60 is then developed using conventional means, and the resulting print 20 is aligned with a lenticular sheet 22 in the manner shown in FIG. 5.

Figure 13:
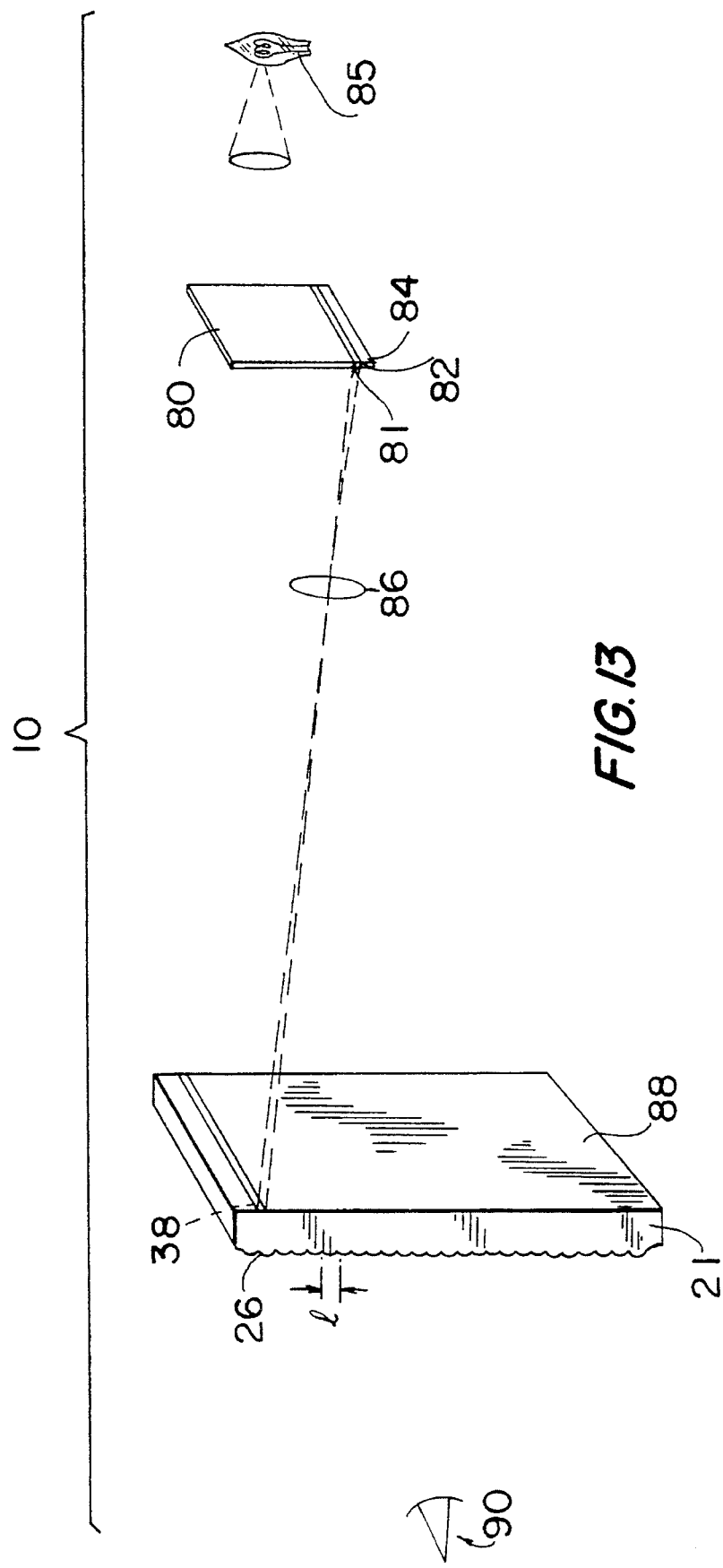
FIG. 13 is representation of a fourth embodiment according to the present invention.

FIG. 13 shows a fourth embodiment of the present invention, in which a transparent print 80, such as a photographic slide or motion picture frame, is made by combining multiple parallax views of a subject using one of the methods of the first three embodiments. A light source 85 projects light through the transparent print 80, and a lens 86 focuses the transmitted light onto a dispersive surface 88, such as a sheet of frosted glass. The dispersive surface lies at the focal plane 38 of a lenticular sheet 22. The magnification of the lens 86 is selected so that the width of images projected by segments 81, 82, 84 of the parallax angle views of the subject onto the dispersive surface 88 are equal to the reciprocal of the number of parallax views of the subject times the width l of the lenticules 26 of the lenticular sheet 22. A three-dimensional image appears when the dispersive surface 88 is viewed through the lenticular sheet 22 by an observer 90.

Using appropriate shutter and film transport mechanisms, the transparent print 80 can be rapidly substituted for a next sequential print to produce a three dimensional motion picture.

Figure 14:
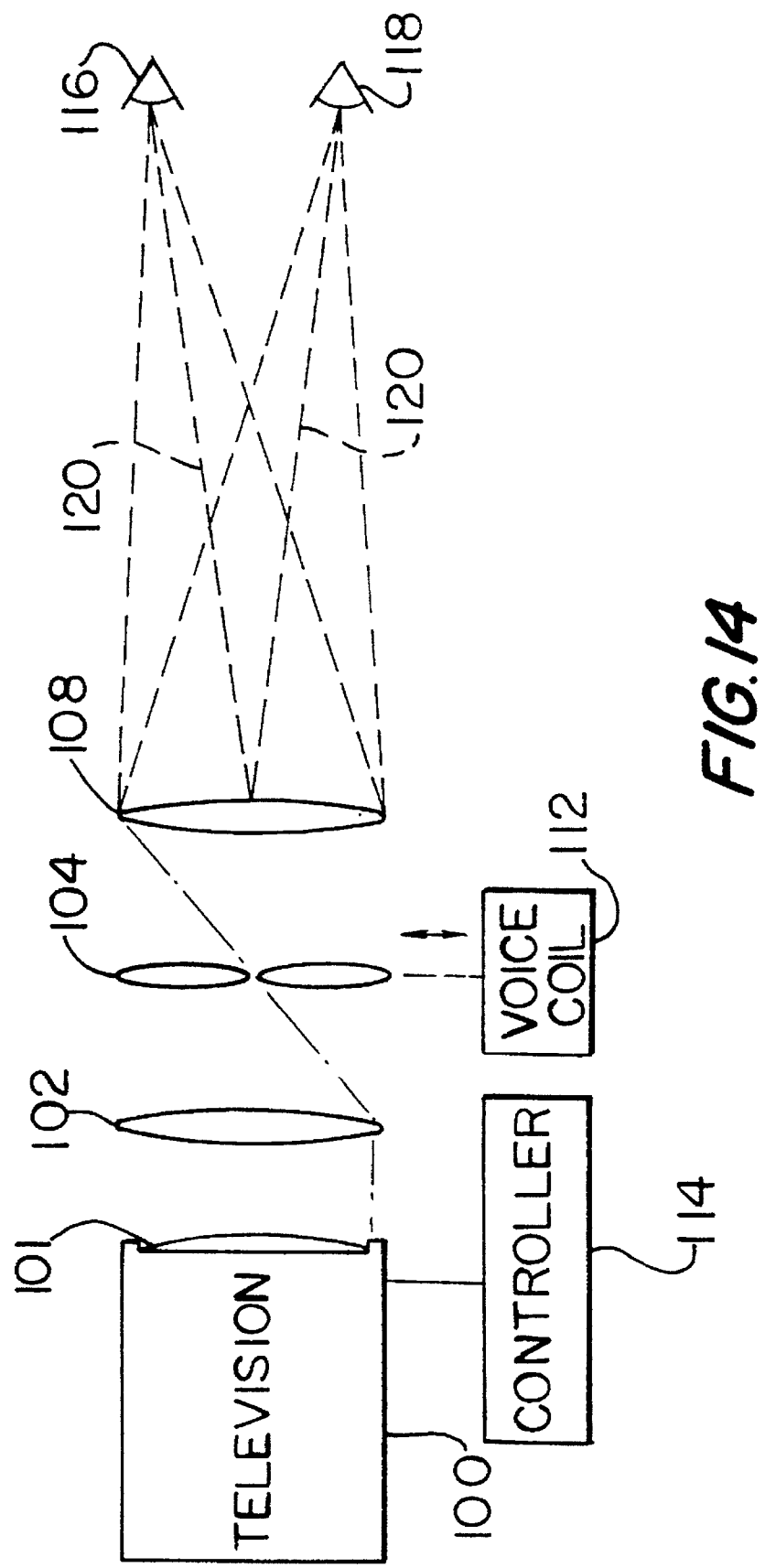
FIG. 14 is a representation of a fifth embodiment according to the present invention.

FIG. 14 shows a fifth embodiment of the present invention, in which a television 100 displays time multiplexed images of a scene from multiple paralax angles. A first lens 102 is placed in front of the television screen 101. Light focused by the lens 102 passes through a slit 104 and then through a second lens 108. The slit 104 is placed at the focal point of the two lenses 102, 104. Light exiting the second lens 108 is viewed by a viewer's right eye 116 and left eye 118. The slit 104 is connected to a voice coil 112, which is controlled by a controller 114.

The controller 114 causes the voice coil 112 to move the slit 104 across the axis of the lenses 102, 108 so that the optical axis 120 of the lenses 102, 108 is shifted. When the television 100 displays a right-eye view of a scene, it sends a signal to the controller 114 to operate the voice coil 112 to move the slit downward, as shown in FIG. 14, displacing the optical axis 120 upward and directing the displayed image toward the viewer's right eye 116. When a left-eye view of a scene is displayed, the slit 104 is moved upward and the image is directed toward the viewer's left eye 118.

Figure 15:
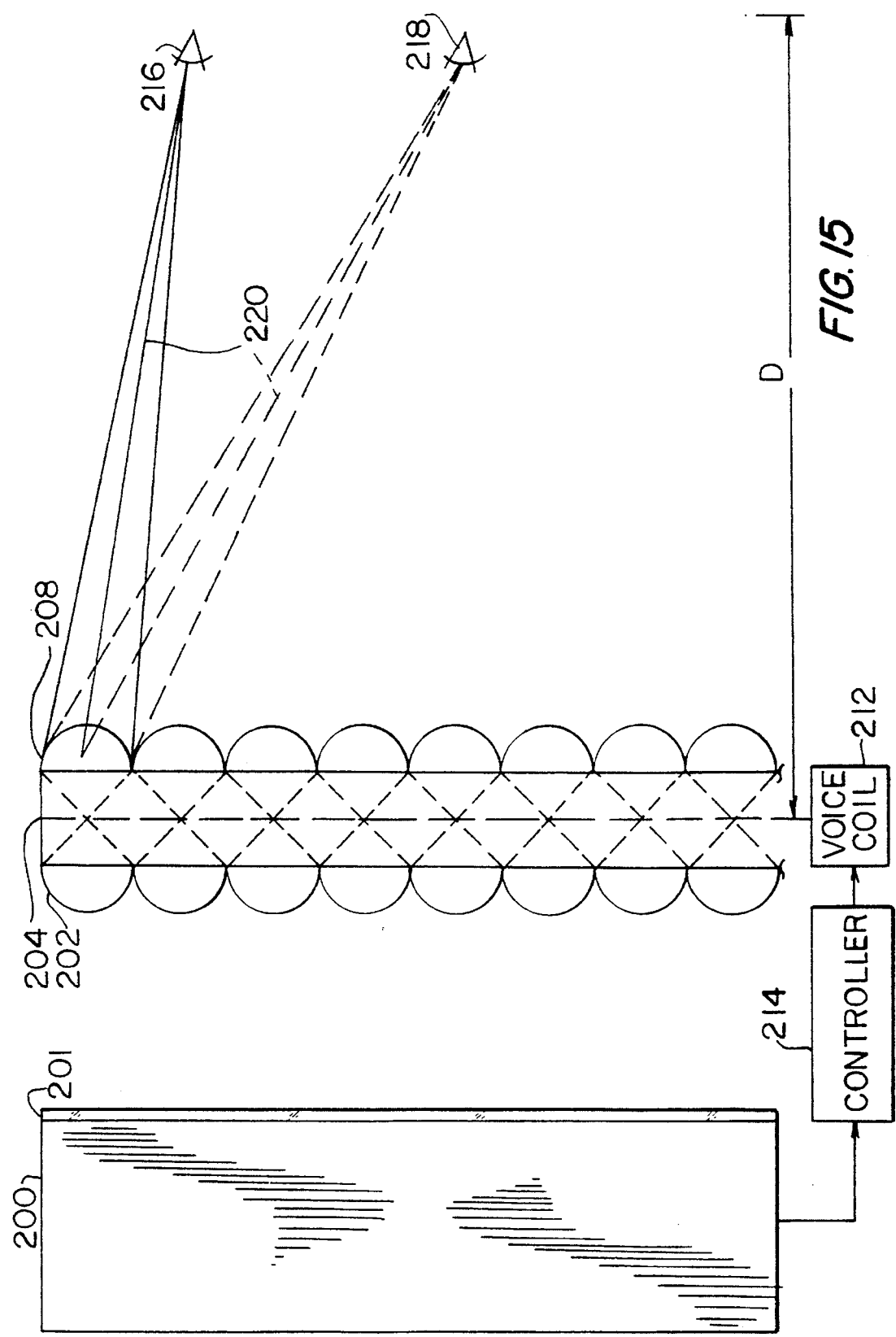
FIG. 15 shows a sixth embodiment of the present invention in which a television displays time-multiplexed paralax views.

FIG. 15 shows a sixth embodiment of the present invention in which a television 200 displays time-multiplexed paralax views of a scene as in the preceding embodiment. Light from the television screen 201 passes through a first lenticular sheet 202, through a line screen mask 204, and through a second lenticular sheet 208. The focal lengths and positions of the lenticular sheets 202, 208 are chosen so that their focal points coincide as in the preceding embodiment. The line screen mask 204 is positioned by a voice coil 212 and controller 214 as in the above embodiments. The line screen mask 204 is positioned to direct the optical axis 220 of each of the lenticules of the second lenticular sheet 208 toward either the right eye 216 or left eye 218 positioned at a viewing distance D depending on the parallax view currently displayed on the television screen 201.

Figure 16:
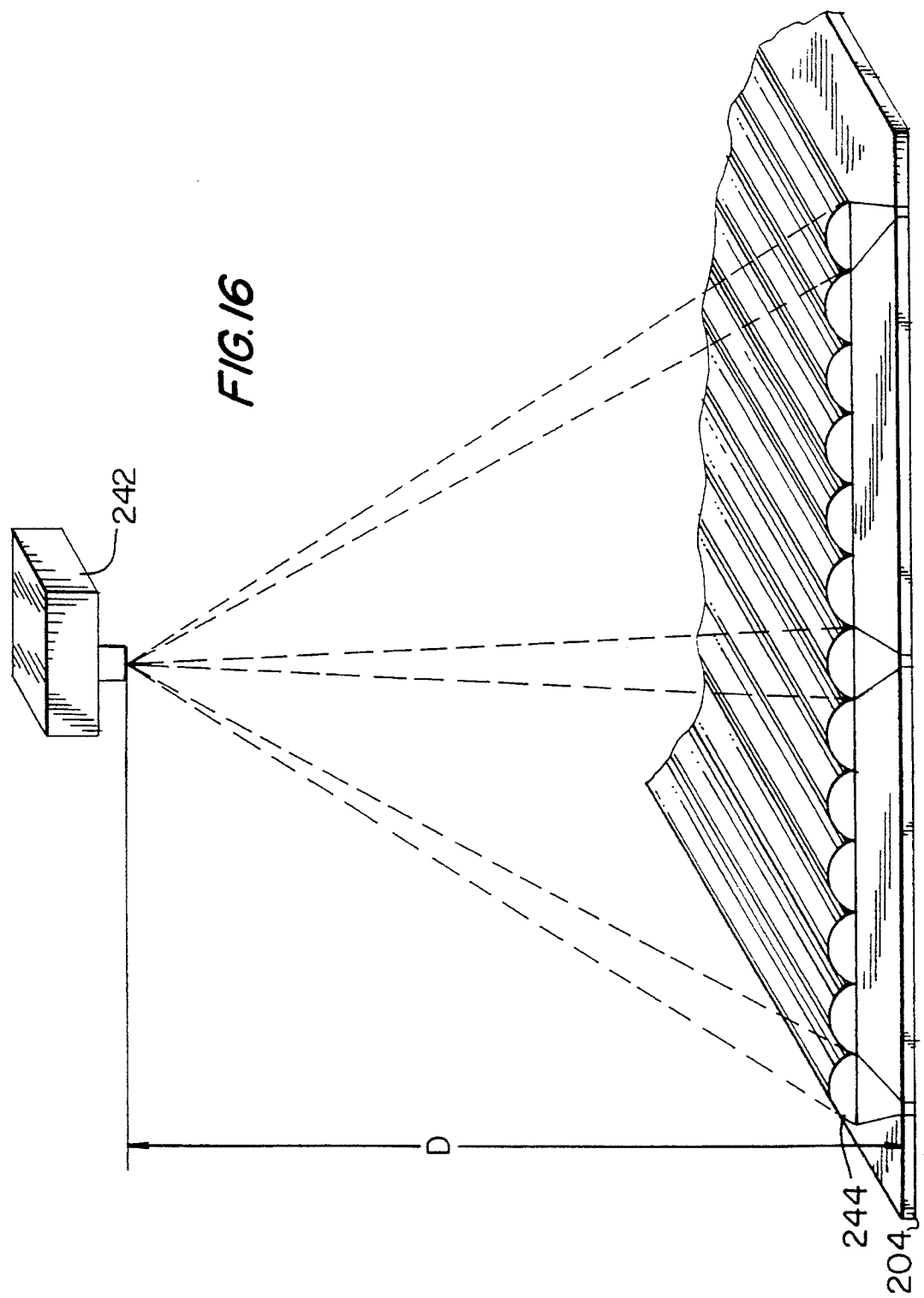
FIG. 16 shows an apparatus for producing the line screen mask.

FIG. 16 shows an apparatus for producing the line screen mask 204. A lenticular sheet 244, identical to the lenticular sheets 204, 208 is placed above a photographic emulsion covered plate 204. Light from a point source of light, for example from a photographic enlarger 242, is directed toward the lenticular sheet 244 from a distance D equal to the viewing distance. The emulsion covered plate 204 is then developed by conventional means so that areas exposed by light focused by each of the lenticules of the lenticular sheet 244 are transparent, while the intervening spaces are opaque. Lenticules away from the center of the sheet will produce clear slits at a point offset from thief optical axis. The offset will be proportional to the distance D and the distance of each lenticule from the center of the sheet.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A method of producing three-dimensional images using a lenticular sheet, comprising the steps of:

capturing a plurality of views of a subject at different parallax angles;

parsing each of the views of the subject into a plurality of narrow rectangular segments equal to the number of lenticules of the lenticular sheet;

compressing the width of each narrow rectangular segment by a ratio equal to the reciprocal of the plurality of parallax views of the subject obtained in the step of capturing;

interleaving the multiplicity of segments;

printing the interleaved segments; and then aligning the printed image with the lenticular sheet following the step of printing the interleaved segments, whereby the position of each segment below each lenticule corresponds to the parallax angle view represented by that segment obtained in the step of capturing.

2. The method of claim 1 wherein the parallax views of a subject are captured photographically.

3. The method of claim 1 wherein the parallax views of a subject are computer graphic renderings.

4. A system for producing three-dimensional images using a lenticular sheet, comprising:

capturing means for capturing multiple parallax views of a subject;

parsing means for dividing each of the multiple parallax views of the subject into a plurality of narrow rectangular segments equal in number to the number of lenticules of the lenticular sheet;

compressing means for compressing the narrow rectangular segments of each of the parallax views of the subject by a ratio determined by a reciprocal of the number of parallax views of the subject captured;

interleaving means for arranging the plurality of compressed segments of each of the parallax views of the subject;

printing means for producing an output of the compressed interleaved segments; and aligning means for aligning the lenticular sheet with the compressed interleaved segments of the output such that the position of each segment below each lenticule corresponds to the parallax angle view represented by that segment;

wherein the capturing means, parsing means, compressing means, interleaving means and printing means are separate and distinct from the lenticular sheet.

5. The system of claim 4 where the capturing means is a CCD camera.

6. The system of claim 4 wherein the printing means are a video display screen whose phosphor coincides with the focal plane of the lenticular sheet.

7. The system of claim 4 wherein the aligning means is a micrometer screw.

8. The system of claim 4 wherein the output is a transmissive image.

9. The system of claim 8 wherein the aligning means comprise:

projecting means for projecting light through the transmissive image;

dispersive means for displaying the transmitted light from the transmissive image on a flat surface at the focal plane of the lenticular sheet; and focusing means for focusing the transmitted light onto the dispersive means.

10. The system of claim 4 wherein the capturing means are coplanar, laterally separated anamorphic lenses.

11. The system of claim 10 wherein the parsing, compressing and interleaving means are a second lenticular sheet.

12. The system of claim 11 wherein the printing means comprises:

photographic recording means placed at the focal plane of the second lenticular sheet;

photographic enlarger means for photographically printing the compressed interleaved image segments at a standard enlargement ratio, whereby the pitch of the compressed interleaved image segments corresponds to the pitch of the lenticular sheet.

13. The system of claim 12 wherein the enlarger means is a contact printer for producing an enlargement ratio of 1:1.

14. A system for producing three dimensional images using a lenticular sheet comprising:

photographic means for producing a series of photographic negative images representing multiple parallax views of a subject;

enlarger means for projecting the photographic negative images sequentially onto a photographic print sheet at an enlargement ration determined by the number of parallax views of the subject and the pitch of the lenticules on the lenticular sheet;

mask means disposed between the enlarger means and the photographic print sheet for exposing narrow rectangular segments of the projected negative image onto the photographic print sheet;

stepping means for stepping the mask means laterally across the surface of the photographic print sheet in synchrony with the sequence of images projected by the enlarger means, whereby each of the negative images representing parallax views of the subject are divide into narrow rectangular segments which are interleaved across the photographic print sheet;

developing means; and aligning means for aligning the lenticular sheet with the compressed interleaved segments of the developed photographic print sheet such that the position of each segment below each lenticule corresponds to the parallax angle view represented by that segment.

15. A system for producing three-dimensional images using a lenticular sheet, comprising:

photographic means for producing a series of photographic negative images representing multiple parallax views of a subject;

enlarger means for projecting the photographic negative images sequentially onto a photographic print sheet at an enlargement ratio determined by the number of parallax views of the subject and the pitch of the lenticules on the lenticular sheet;

plural mask means, each corresponding to one of the multiple parallax views of the subject, consisting of regularly spaced, transparent, narrow, rectangular segments separated by opaque regions wherein the spatial frequency of the transparent segments is equal to the spatial frequency of the lenticules on the lenticular sheet and the position of the segments relative to one another is determined by the parallax angle of the corresponding view of the subject;

disposing means for placing each of the mask means between the enlarger means and the photographic print sheet in synchrony with the sequential projection the parallax views of the subject corresponding to that mask by the enlarger means, whereby each of the negative images representing parallax views of the subject are divide into narrow rectangular segments which are interleaved across the photographic print sheet;

developing means; and aligning means for aligning the lenticular sheet with the compressed interleaved segments of the output such that the position of each segment below each lenticule corresponds to the parallax angle view represented by that segment.

* * * * *